Figure 1:
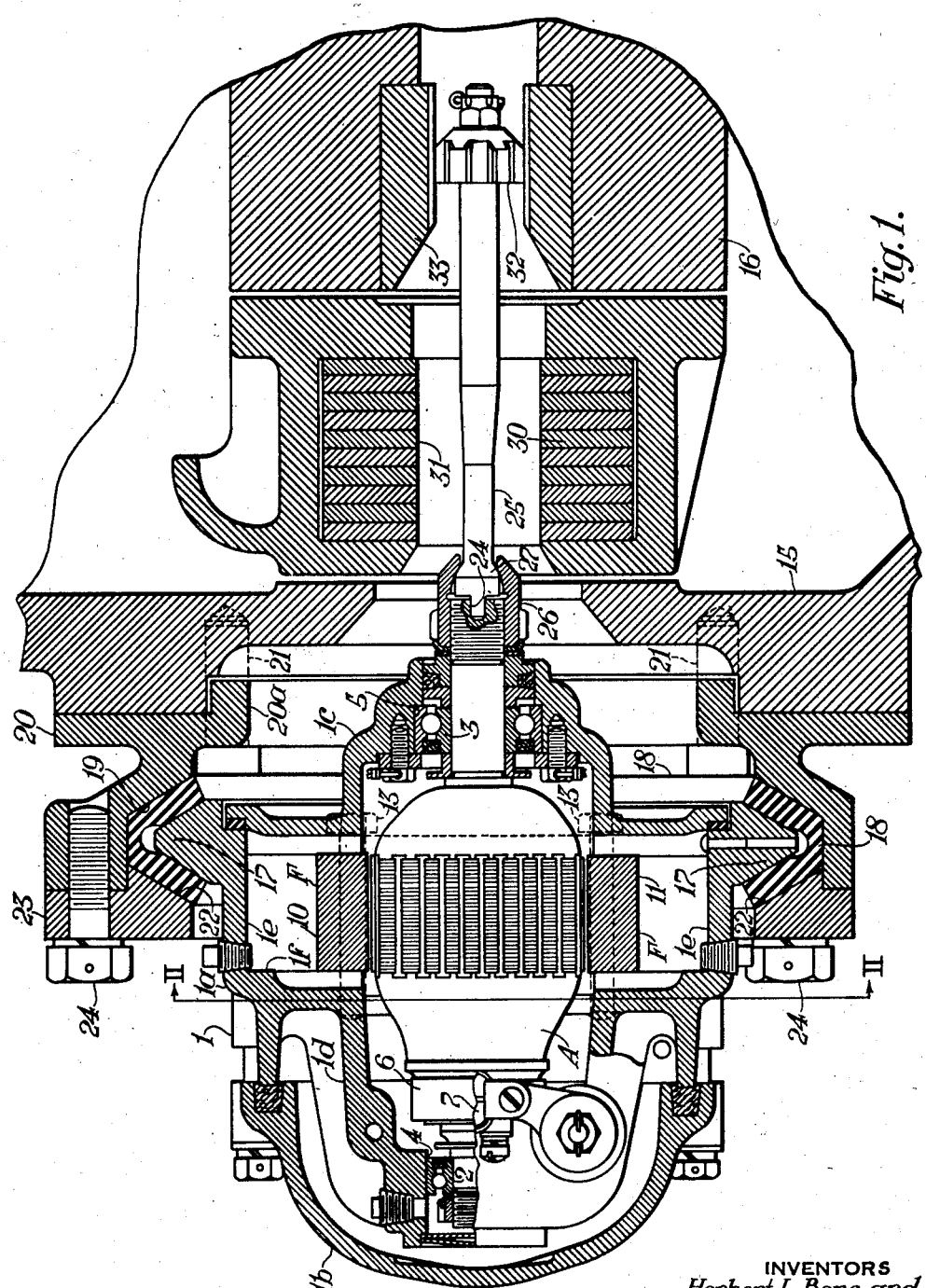

March 16, 1943.  H. L. BONE ET AL  2,313,916
GENERATOR AND MOUNTING MEANS THEREFOR
Filed Jan. 4, 1941  3 Sheets-Sheet 1

INVENTORS
Herbert L. Bone and
John W. Livingston
by
THEIR ATTORNEY

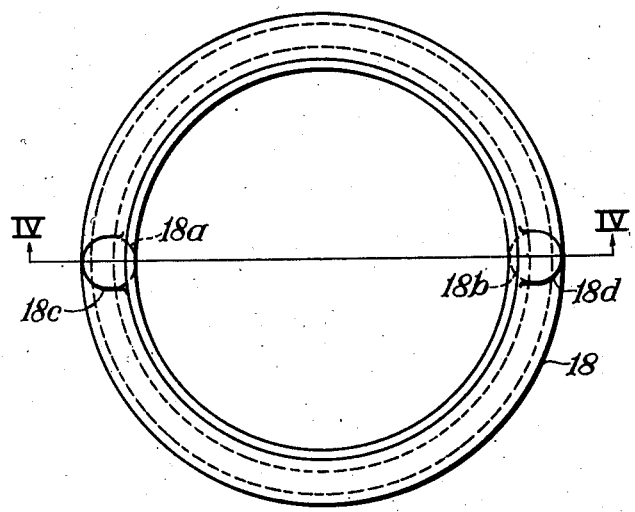
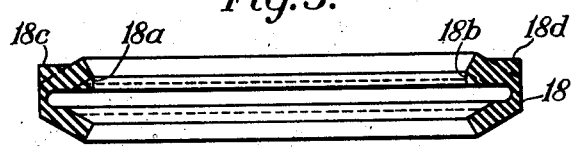
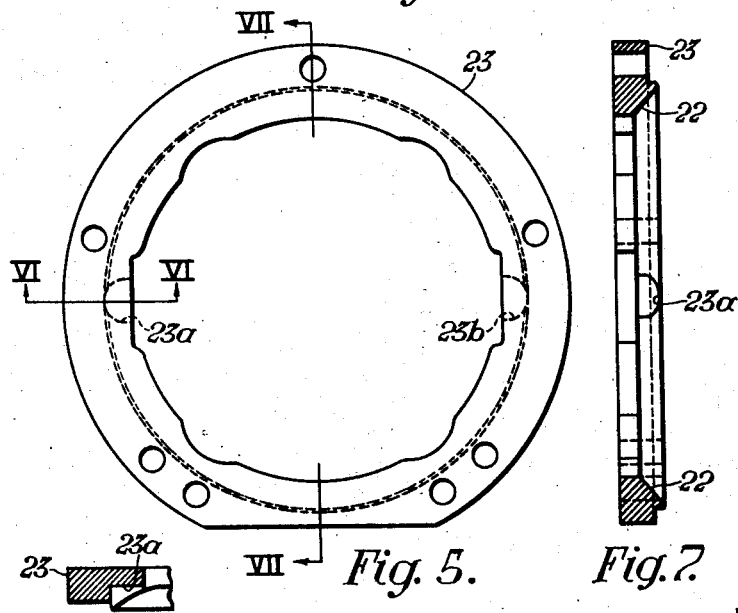
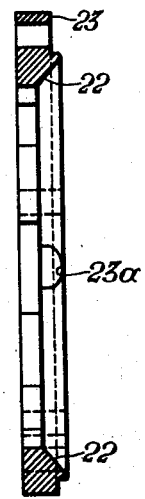

Patented Mar. 16, 1943

2,313,916

UNITED STATES PATENT OFFICE 2,313,916

GENERATOR AND MOUNTING MEANS THEREFOR

Herbert L. Bone and John W. Livingston, Forest Hills, Pa., assignors to The Union Switch & Signal Company, Swissvale, Pa., a corporation of Pennsylvania Application January 4, 1941, Serial No. 373,132

7 Claims. (Cl. 105—96.1)

Our invention relates to generators, and particularly to generators which are intended to be mounted on the journal boxes, and driven from the axles, of cars or locomotives which are in high speed service for indicating or controlling the speed of the cars or locomotives, for controlling the braking ratio, or the like.

As is well known, the axles of cars and locomotives have at least a limited amount of movement vertically, horizontally, and axially relative to the journal boxes, and it is obvious that in order to satisfactorily drive from the axles any form of devices which are mounted on the journal boxes it is necessary to employ a transmission mechanism which will allow for the relative movement between the journal boxes and the axles. Substantially all forms of transmission mechanisms which will allow for the necessary relative movement employ universal joints, and it is essential for the best operation of these mechanisms that the driven device should be mounted as nearly as possible in axial alignment with the associated axle when the axle occupies its normal position relative to the journal box.

It is also well known that any device which is mounted on the journal box of a high speed train is subjected to considerable shock and vibration which will produce undesirable wear unless suitable means are provided to absorb the shock and vibration.

One object of our invention is to provide an improved mounting means for a generator of the type described which will not only effectively cushion the generator against damaging shock and vibration, but which at the same time serves to automatically accurately locate the generator in the position in which its armature aligns axially with the axle when the latter is in its normal position relative to the journal box.

According to our invention, the generator housing is provided at one end with an annular V-shaped flange surrounded by a rubber ring which is moulded to fit the flange. The one side of the rubber ring fits into a tapered or beveled annular recess formed either directly in the journal box face or in the outer face of an adapter plate which is bolted to the journal box face, and the whole assembly is clamped in place by a clamping ring having a tapered or beveled annular face which projects into the recess in the adapter plate and engages the other side of the rubber ring. The spacing between the bottom of the recess in the adapter plate and the beveled face of the clamping ring is such that a definite compression of the rubber ring is provided when the clamping ring is secured in place, and the angles of the side faces of the rubber ring and the engaging faces of the adapter plate and clamping ring are so chosen that with the rubber ring properly compressed, the generator assembly will automatically center itself with respect to the adapter plate, which latter is accurately positioned with respect to the normal position of the axle. For the purpose of preventing rotation of the generator two laterally projecting diametrically opposite projections or positioning lugs are provided on the one inside face of the rubber ring, which lugs fit within recesses formed in the one side of the V-shaped flange on the generator housing, and two other laterally projecting diametrically opposite projections or positioning lugs are provided on the contiguous outside face of the ring, which latter lugs fit within recesses formed in the clamping ring. The locations of these lugs is such that the generator can be mounted in either one of two positions spaced 180° apart.

Other objects and characteristic features of our invention will become apparent as the description proceeds.

We shall describe one form of generator embodying our invention, and one form of mounting means therefor, and shall then point out the novel features thereof in claims.

Figure 2:
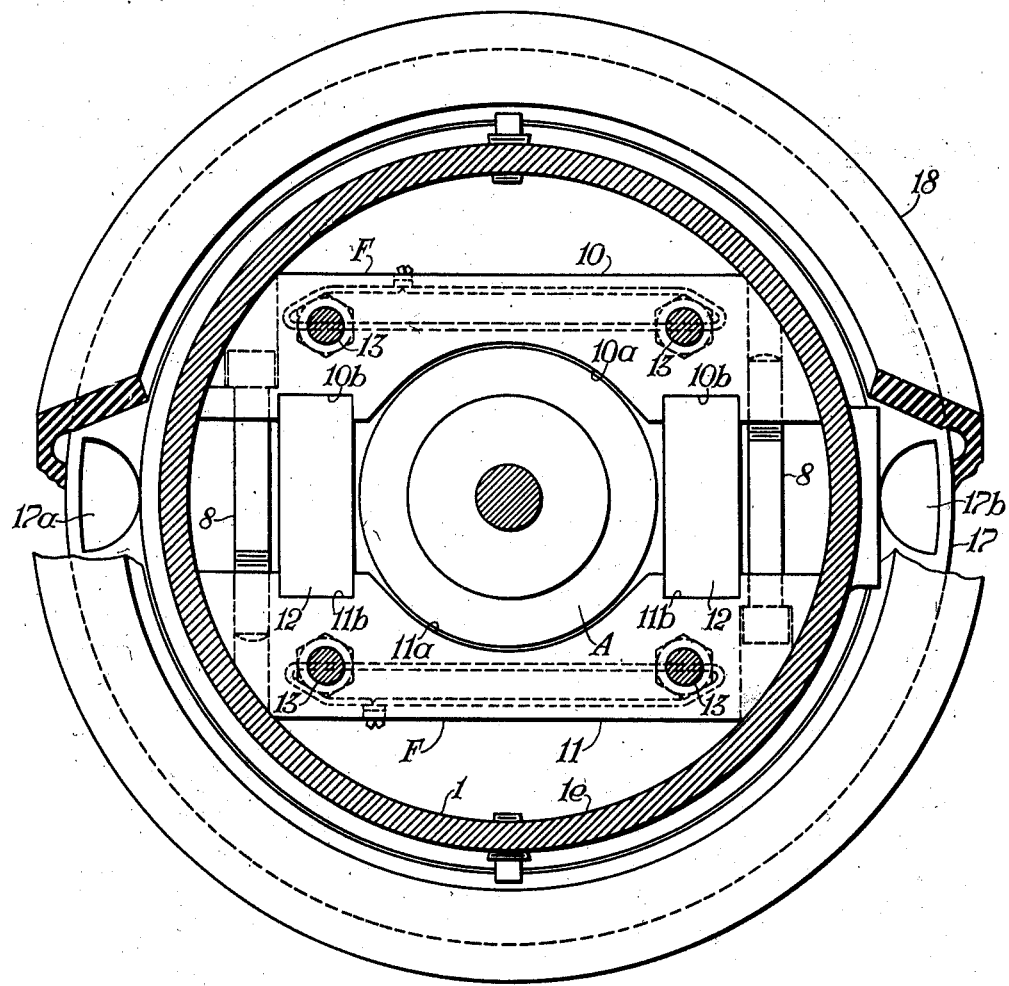

In the accompanying drawings, Fig. 1 is a vertical sectional view showing a generator constructed in accordance with our invention operatively connected with a vehicle axle, the generator being mounted on the journal box at one end of the axle by mounting means which also embodies our invention. Fig. 2 is a sectional view taken substantially on the line II—II of Fig. 1. Fig. 3 is a view on a reduced scale of the rubber ring 18 as it appears when viewed from the front in Fig. 2. Fig. 4 is a detail sectional view taken on the line IV—IV of Fig. 3. Fig. 5 is a view on a reduced scale of the clamping ring 23 as it appears when viewed from the left in Fig. 1. Figs. 6 and 7 are sectional views taken on the lines VI—VI and VII—VII, respectively, of Fig. 5.

Similar reference characters refer to similar parts in each of the several views.

Referring to the drawings, a generator embodying our invention comprises, as usual, an armature A and a field assembly F disposed within a suitable housing 1. This housing as shown consists of a main body portion 1a provided at one end cap 1b and at the other end with an end bell 1c, The armature A is of conventional construction, and is rotatably mounted in suitable anti-friction bearings 2 and 3 secured within bearing openings 4 and 5 formed respectively in a bearing and brush support 1d provided on the main body portion 1a and in an end bell 1c. The armature commutator 6 is disposed within the support 1d and cooperates with brushes not shown mounted in brush holders 7 secured to the support. The construction of the brushes and brush holders forms no part of our present invention, and hence need not be specifically described.

The field assembly of the generator consists of magnetizable pole pieces 10 and 11, preferably of cold rolled steel, and permanent magnets 12 which are clamped between the pole pieces on opposite sides of the armature by means of two socket head cap screws 8 of non-magnetic material. The pole pieces are provided with curved pole faces 10a and 11a for cooperation with the armature, and with recesses 10b and 11b which receive the ends of the magnets to retain them in the proper positions and to provide a good magnetic connection between the permanent magnets and the pole pieces. It will be noted that the permanent magnets are in the form of rectangular bars which eliminates any necessity for machining the magnets, whereby the cost of construction of the field assembly is reduced to a minimum.

The field assembly is disposed within a bore 1e formed in the main body portion 1a of the housing 1, and this bore and the cooperating outer surfaces of the pole pieces are accurately machined to provide a press fit between the field assembly and the housing. This fit, while sufficiently tight to snugly hold the field assembly in place, is not tight enough to set up undesirable stresses in the magnets.

The field assembly in addition to being held in place by a press fit between it and the housing is clamped between a shoulder 1f formed in the body at the inner end of the bore 1e and the end bell 1c by means of four bolts 13 which pass through clearance holes in the end bell and the pole pieces and are screwed into tapped holes provided in the body casting. It will be observed that the bolts 13 comprise the means for securing the end bell 1c to the main body portion of the housing.

The generator is intended to be mounted on the journal box 15 of a car or locomotive in a position to be driven from the end of the associated axle 16, and to this end the body portion 1a of the housing 1 is provided with an outwardly extending annular flange 17 concentric with the axis of the generator shaft. This flange is substantially triangular or V-shaped in cross section, and is surrounded by a resilient ring 18 preferably of rubber, "neoprene" or the like having a substantially V-shaped cross section. One side of the ring 18 fits into a tapered or beveled annular mating recess 19 formed in the outer face of an adapted plate 20 which is bolted by means of tap bolts 21 to the outer face of the journal box in place of the usual cover plate, and the other side of this ring is engaged by a beveled annular face 22 which is formed on a clamping ring 23 and which projects into the recess 19 in the adapter plate. The clamping ring 23 is bolted by means of tap bolts 24 to the outer face of the adapter plate. The spacing between the bottom of the recess 19 and the confronting face 22 of the clamping ring 23 is such that a definite compression of the rubber ring is provided when the clamping ring is secured in place, and the angular disposition of the side faces of the rubber ring and mating faces of the clamping ring and adapted plate are so chosen that when the rubber ring is compressed in the intended manner by the clamping ring the generator will accurately automatically position itself with respect to the adapter plate. The adapter plate is accurately located with respect to the housing in the position in which said annular recess is in axial alignment with the axis of said axle in the normal position of the latter, and it follows that the generator is automatically centered by the mounting in the position in which the generator shaft and the vehicle axle are normally in axial alignment.

It is desirable that the resilient mounting should be as flexible as possible in order to reduce the shock transmitted to the generator through the mounting to a minimum, and it is well known that the greatest amount of flexibility for a given amount of material in the resilient ring 18 is obtained when the forces which are exerted on the ring are a combination of shear and compression. With the resilient ring constructed and clamped between the flange 17 and the parts 23 and 20 in the manner just described, the forces transmitted to this ring will inherently be a combination of shear and compression provided some clearance is maintained between the apex of the flange 17 and the bottom of the V-shaped groove in the ring, and it is for this purpose that the clearance shown in Fig. 1 between the apex of the flange and the bottom of the V-shaped groove in the ring has been provided.

For the purpose of preventing the generator from rotating relative to the journal box, the rubber ring 18 is provided on its one inside face with two inwardly projecting diametrically opposite projections or positioning lugs 18a and 18b (see Figs. 3 and 4) which lugs fit interchangeably within correspondingly shaped recesses 17a and 17b (see Fig. 2) formed in the adjacent side face of the flange 17. The ring 18 is also provided with two other outwardly projecting diametrically opposite projections or positioning lugs 18c and 18d which fit interchangeably within correspondingly shaped recesses or depressions 23a and 23b formed in the inside face of the clamping ring 23. It will be obvious that with the lugs 18a, 18b, 18c and 18d arranged in the manner described the generator can be mounted in either one of two angular positions spaced 180° apart. These positions are so chosen that a cable outlet not shown can be located either at the right-hand or the left-hand side of the journal box.

The adapter plate 20 is provided with an opening 20a through which the one end of the generator shaft extends with considerable clearance. This end of the shaft is formed with a transverse groove 24 which receives with some clearance a tongue formed on one end of a drive shaft 25 and is threaded to receive a hollow nut 26 which cooperates with a shoulder 27 formed on the drive shaft to hold the drive shaft in the position in which the tongue is within the groove 24. The shoulder 27 and the adjacent face of the nut are rounded, and it will be obvious that the shoulder and nut cooperate to provide a ball and socket type universal joint whereby a limited amount of axial misalignment is permitted between the generator and the drive shaft 25.

The journal box shown is of the type employed with a roller bearing axle assembly having a thrust plate assembly 30 disposed within the box to control end play, and the drive shaft extends with clearance through a central bore 31 in the thrust plate assembly and has keyed to its inner end a splined member 32 which engages a splined plug 33 centered in the end of the axle. Torque is transmitted from the axle to the drive shaft through the splined member which also provides for relative endwise movement between the drive shaft and the axle caused by the permissible endwise movement between the axle and the journal box. The splined member is so shaped that it permits a limited amount of axial misalignment between the drive shaft and the axle.

One advantage of mounting means embodying our invention is that the rubber ring provides a resilient mounting which automatically centers the generator, and in addition serves as an oil seal and as a means to fasten the generator in either one of two angular positions spaced 180° apart.

Although we have herein shown and described only one form of generator embodying our invention, and one form of mounting means therefor, it is understood that various changes and modifications may be made therein within the scope of the appended claims without departing from the spirit and scope of our invention.

Having thus described our invention, what we claim is:

1. A self-centering shock absorbing mounting for a device which is adapted to be secured to the axle housing and driven from the axle of a railway vehicle, said mounting comprising an outwardly extending substantially V-shaped flange on the device, a resilient vibration absorbing ring substantially V-shaped in cross section surrounding said flange, a plate secured to the axle housing and provided with an annular recess which mates with and receives the one side of said resilient ring, and a clamping ring provided with an annular face which mates with and engages the other side of said resilient ring securely clamped in a position to partly compress said resilient ring, clearance being provided between said flange at its point of maximum diameter and said resilient ring to increase the flexibility of said mounting.

2. A mounting for an axle driven generator comprising an annular outwardly extending flange having converging faces provided on the generator, a resilient ring having converging outer and inner side faces and fitting said flange, supporting means secured in a fixed position adjacent the axle and provided with a recess which mates with and receives one outer face of said ring, and a clamping ring secured to said supporting means and provided with an annular face which mates with and engages the other outer face of said resilient ring, the parts being so proportioned that said resilient ring is partly compressed between said supporting plate and said clamping ring whereby said generator is resiliently supported by said resilient ring in a particular self-centering position, clearance being provided between said flange at its point of maximum diameter and said resilient ring to increase the flexibility of said mounting.

3. A mounting for resiliently securing an axle driven generator to the axle housing of a railway vehicle, said mounting comprising an outwardly extending substantially V-shaped annular flange provided on the generator housing, a substantially V-shaped ring of resilient material such as rubber surrounding said flange, an adapter plate secured to the axle housing in place of the usual cover plate and provided with a recess which mates with and receives one side face of said resilient ring, and a clamping plate secured to said adapter plate and provided with a beveled face which mates with and engages the other side face of said resilient ring in a manner to compress said resilient ring, the recess in said adapter plate being concentric with the axis of said axle in its normal position and said annular flange being concentric with the axis of the generator shaft whereby said generator is automatically centered by said mounting in the position in which said generator shaft and said axle are normally in axial alignment.

4. A mounting for resiliently securing an axle driven device to the axle housing of a railway vehicle, said mounting comprising an outwardly extending substantially V-shaped annular flange provided on the device housing, a substantially V-shaped ring of resilient material such as rubber surrounding said flange, an adapter plate secured to the axle housing in place of the usual cover plate and provided with a recess which mates with and receives one side face of said resilient ring, a clamping plate secured to said adapter plate and provided with a face which mates with and engages the other side face of said resilient ring in a manner to compress said resilient ring, the recess in said adapter plate being concentric with the axis of said axle in its normal position and said annular flange being concentric with the axis of the device shaft whereby said device is automatically centered by said mounting in the position in which said device shaft and said axle are normal in axial alignment, and lateral projections on said ring fitting in recesses in said flange and said clamping ring for preventing rotation of the device.

5. A mounting for resiliently securing an axle driven generator to the axle housing of a railway vehicle, said mounting comprising an outwardly extending substantially V-shaped annular flange provided on the generator housing, a substantially V-shaped ring of resilient material such as rubber surrounding said flange, an adapter plate secured to the axle housing in place of the usual cover plate and provided with a recess which mates with and receives one side face of said resilient ring, a clamping plate secured to said adapter plate and provided with a face which mates with and engages the other side face of said resilient ring in a manner to compress said resilient ring, the recess in said adapter plate being concentric with the axis of said axle in its normal position and said annular flange being concentric with the axis of the generator shaft whereby said generator is automatically centered by said mounting in the position in which said generator shaft and said axle are normally in axial alignment, and lateral projections on said ring spaced 180° apart and fitting in recesses in said flange and said clamping ring for securing said generator in either one of two angular positions spaced 180° apart.

6. A mounting for resiliently supporting a generator from the housing of a vehicle axle in a position to be driven from the end of the axle by a driving mechanism requiring for its best operation that the generator shaft align axially with the axle in the normal position of the latter but permitting a limited amount of movement of the axle vertically, horizontally and laterally relative to the generator shaft, said mounting comprising an outwardly extending annular flange on the generator concentric with the axis of the generator shaft, said flange being triangular in cross section, a V-shaped resilient ring disposed on said flange, an adapter plate secured to the axle housing and having a recess in axial alignment with the vehicle axle in the normal position of the latter which recess mates with and receives one side of said resilient ring, and a clamping ring secured to said adapter plate and having a face which mates with and engages the other side of said resilient ring in a manner to partially compress said resilient ring between said clamping ring and said adapter plate.

7. A mounting for resiliently supporting a generator from the housing of a vehicle axle in a position to be driven from the end of the axle by a driving mechanism requiring for its best operation that the generator shaft align axially with the axle in the normal position of the latter but permitting a limited amount of movement of the axle vertically, horizontally and laterally relative to the generator shaft, said mounting comprising an outwardly extending annular flange on the generator concentric with the axis of the generator shaft, said flange being triangular in cross section, a V-shaped resilient ring disposed on said flange, an adapter plate secured to the axle housing and having a recess in axial alignment with the vehicle axle in the normal position of the latter which recess mates with and receives one side of said resilient ring, a clamping ring secured to said adapter plate and having a face which mates with and engages the other side of said resilient ring in a manner to partially compress said resilient ring between said clamping ring and said adapter plate, and means for preventing angular movement of said resilient ring relative to said generator and said clamping ring.

HERBERT L. BONE.
JOHN W. LIVINGSTON.